Jan. 10, 1967 E. S. LEE III 3,297,950

SHIFT-REGISTER WITH INTERCOUPLING NETWORKS EFFECTING MOMENTARY CHANGE IN CONDUCTIVE CONDITION OF STORAGE-STAGES FOR RAPID SHIFTING

Filed Dec. 13, 1963 5 Sheets-Sheet 1

INVENTOR.
EDWIN S. LEE, III

BY Christie, Parker & Hale
ATTORNEYS.

INVENTOR.
EDWIN S. LEE, III
BY
Christie, Parker & Hale
ATTORNEYS.

INVENTOR.
EDWIN S. LEE, III
BY
Christie, Parker & Hale
ATTORNEYS.

SHIFT-REGISTER WITH INTERCOUPLING NETWORKS EFFECTING MOMENTARY CHANGE IN CONDUCTIVE CONDITION OF STORAGE-STAGES FOR RAPID SHIFTING

Filed Dec. 13, 1963 5 Sheets-Sheet 4

INVENTOR.
EDWIN S. LEE, III
BY
Christie, Parker & Hale
ATTORNEYS.

Jan. 10, 1967 E. S. LEE III 3,297,950

SHIFT-REGISTER WITH INTERCOUPLING NETWORKS EFFECTING MOMENTARY CHANGE IN CONDUCTIVE CONDITION OF STORAGE-STAGES FOR RAPID SHIFTING

Filed Dec. 13, 1963 5 Sheets-Sheet 5

3,297,950
Patented Jan. 10, 1967

3,297,950

SHIFT-REGISTER WITH INTERCOUPLING NETWORKS EFFECTING MOMENTARY CHANGE IN CONDUCTIVE CONDITION OF STORAGE-STAGES FOR RAPID SHIFTING

Edwin S. Lee III, West Covina, Calif., assignor to Burroughs Corporation, Detroit, Mich., a corporation of Michigan Filed Dec. 13, 1963, Ser. No. 330,440
10 Claims. (Cl. 328—37)

This invention relates to electronic shift registers.

Electronic shift registers are conventionally utilized in data handling circuits and computing circuits. The electronic shift registers are utilized to sequentially shift the position of stored data signals from stage to stage in response to a shifting pulse. One of the important characteristics of the shift register is the rate at which information may be shifted from stage to stage. At the present state of the art, the highest shifting speeds are obtained by means of shifting registers that are complex and expensive. The less expensive shift registers exhibit much lower shifting speeds.

The present invention provides an improved, high speed, inexpensive shift register that allows shifting rates in excess of two megacycles. In addition, the simple circuit configuration employed for the shifting stages of the present invention allow the shift register to be constructed in terms of integrated circuit techniques to further reduce the manufacturing costs of such a shift register.

Broadly, the shift register of the present invention comprises a plurality of shifting stages wherein each shifting stage includes a transistorized bistable element and a temporary storage device for transmitting the binary character stored in the associated bistable circuit to the succeeding shifting stage or bistable storage circuit. The circuit arrangement leads to the high shifting speeds through the mere application of a control potential for momentarily altering the conductive condition of the shifting stages resulting in the transfer of the stored binary characters from stage to stage in the usual shifting register pattern. The temporary storage device may be constructed as another bistable storage element or as a resistance-capacitance network. The device need only reflect the conductive condition of the associated storage element to allow the stored signal to be transferred therethrough to the succeeding shifting stage.

These and other features of the present invention may be more fully appreciated when considered in the light of the following specification and drawings, in which.

Now referring to FIG. 1 the details of the circuit configuration of an embodiment of the shift register will be described. As in conventional shift registers for shifting binary coded signals, each shifting stage of the shift register of the present invention is constructed essentially identical for shifting the signals or binary characters from stage to stage. In the shift register of the present invention as embodied in FIG. 1, each shifting stage comprises a signal storage element for storing a binary character in the shifting stage and an associated signal transmitting element. The signal transmitting element may be further characterized as a temporary storage device for reflecting the storage condition of the associated signal storage element. The shifting of the signals from stage to stage is simply effected by the present invention by momentarily modifying the conductive conditions of each of the shifting stages whereby each shifting stage has assumed the conductive condition of the previous stage upon the termination of the shifting signal. The shifting signal is provided by a periodic change in the potential level to the shifting stages to produce the transfer of information.

Figure 1:
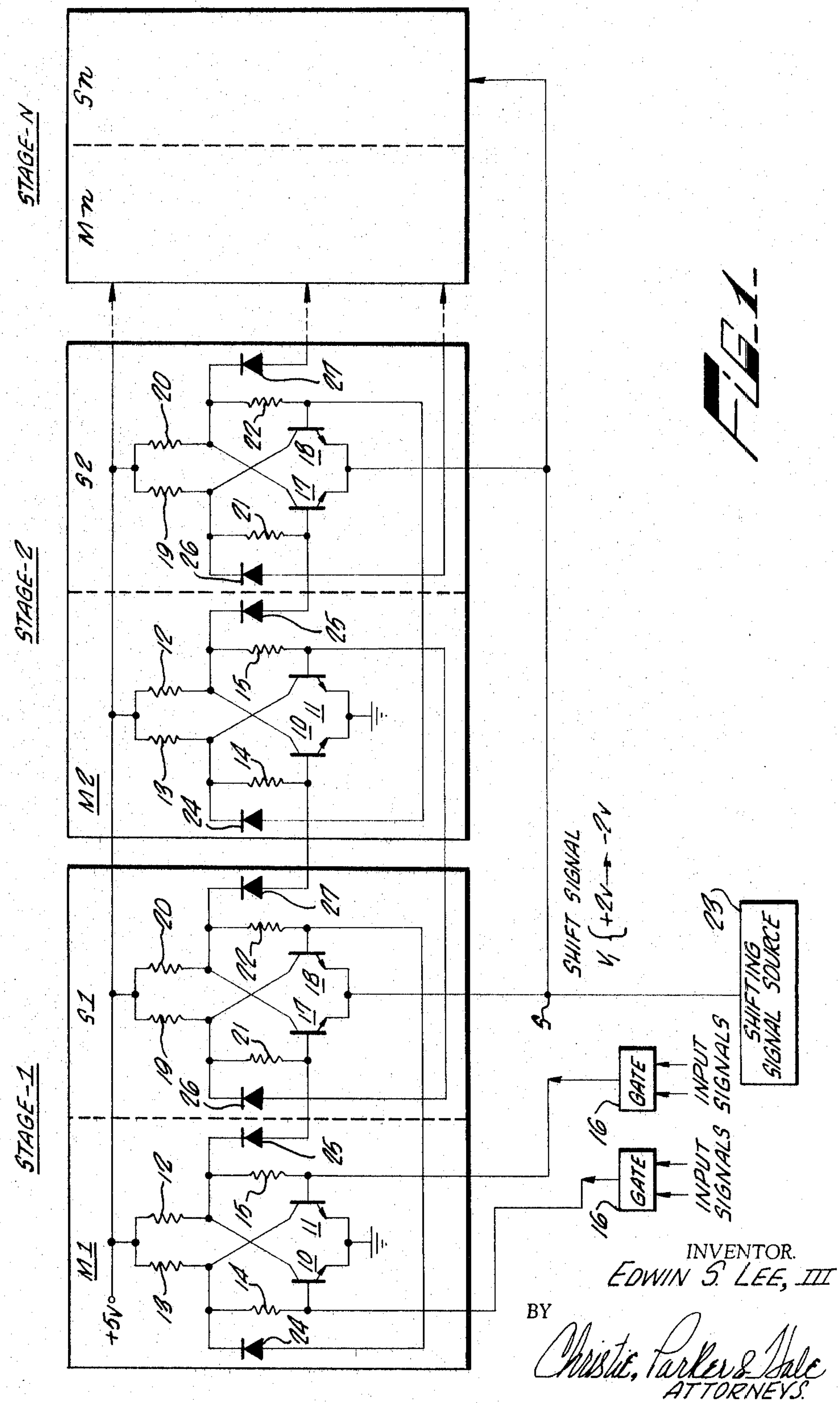
FIG. 1 is a schematic circuit diagram of a shift register embodying the invention.

Referring to the signal storage element identified as M1 for stage 1 of the shift register of FIG. 1, it will be seen that the storage element comprises a transistor bistable storage element arranged in the usual symmetrical circuit configuration and therefore stores a binary one or zero in accordance with the alternate conduction and non-conduction of the transistors thereof. As illustrated, the emitter electrodes of the transistors 10 and 11 are connected in common and to a point of reference potential or ground potential. The collector electrodes are shown in a cross-connected relationship and connected to the collector impedance elements shown as the resistor 12 for the transistor 10 and the resistor 13 for the transistor 11. The opposite ends of the resistive impedance elements 12 and 13 are connected in common to a point of positive potential, shown as +5 volts. The base electrode of the transistor 10 is connected to a base resistive impedance element 14 connected in series circuit relationship with the resistor 13 and the +5 volt terminal. In the same fashion a resistive impedance element 15 is connected to the base electrode for the transistor 11 and in series with the resistive element 12 and the +5 volt terminal.

It will be appreciated by those skilled in the art that the symmetrical circuit configuration of the bistable circuit described is such that one of the transistors 10 or 11 is in a fully conducting condition while the other transistor is in a cut off condition. As is conventional, the binary character stored in the signal storage element is identified in accordance with the conductive condition of the transistors 10 and 11. For example, it may be assumed that if a binary one is stored in the signal storage element when the transistor 10 is fully conducting, a binary zero is stored when the transistor 10 is cut off and the transistor 11 is fully conducting. To this end, the signals stored in the signal storage element are applied thereto by means of a connection to the base electrodes of the transistors 10 and 11 from an input gating circuit 16, as illustrated. The gating circuit 16 may be any conventional AND or OR circuit for applying the desired binary character to the shifting register. Alternatively the information may be derived from the last or "N" shifting stage and recirculated back to the first stage.

Now referring to the signal transmitting element of the shifting stages and which elements are within the portion of the shifting stages identified as S1, S2, et cetera. The transistors 17 and 18 of the signal transmitting elements are arranged in identical circuit configuration as the associated signal storage elements. To this end, the collector resistive impedance elements 19 and 20 for the transistors 17 and 18 respectively are connected in the same configuration to the +5 volt terminal and each of the resistors 12, 13, 19, and 20 have substantially the same impedance value of the order of 1,000 ohms. The resistive elements 19 and 20 are connected to the +5 volt terminal by means of a common bus, as illustrated. In the same fashion, the base impedance elements 21 and 22 for the transistors 17 and 18, respectively, are defined identical to the resistive elements 14 and 15 for the signal storage elements and each of these resistive elements 14, 15, 21, and 22 have an impedance value on the order of 5,000 ohms. The emitter electrodes for the transistors 17 and 18 for each stage are connected in common and in turn are each connected to the shifting signal source shown in block form and identified by the reference numeral 23 through the shifting terminal S.

The elements of the shifting stages are inter-coupled by means of a first coupling means functioning to couple the signal storage element of a shifting stage to its associated signal storage storage element. The first coupling means comprises the diodes 24 and 25. The diode 24 is connected to the common junction between the resistors 13 and 14 with its cathode electrode connected to this junction and its anode electrode connected to the base electrode for the transistor 18 of the signal transmitting element. In the same fashion, the diode 25 is connected with its cathode electrode connected to the common junction of the resistors 12 and 15 and its anode electrode connected to the base electrode for the transistor 17 of the associated signal transmitting element. The coupling afforded by the diodes 24 and 25 is effective to cause the signal transmitting elements S1, S2, et cetera to reflect the conductive condition of the associated signal storage elements under steady state conditions.

A second coupling means couples the signal transmitting element of one shifting stage to the signal storage element of the succeeding shifting stage, i.e., S1 to M2, S2 to M3, et cetera. To this end, the diode 26 is coupled between the common junction of the resistors 19 and 21 with its cathode electrode connected thereto and its anode electrode connected directly to the base electrode for the transistor 11 of the signal storage element of the succeding shifting stage, M2. In the same fashion, the diode 27 is coupled with its cathode electrode in common with the junction of the resistors 20 and 22 and its anode electrode connected directly to the base electrode of the transistor 10 of the signal storage element M2. As will be explained immediately hereinafter, upon the reception of a shifting signal at the signal transmitting element of each shifting stage, the first coupling means will be effectively decoupled while the second coupling means is rendered effective to allow the signal to be shifted from the signal transmitting element of one stage to the signal storage element of the succeeding stage for effecting the shifting of the binary characters.

The shifting of the stored signals from stage to stage is effected by changing the level of the potential on the shift terminal S. The shift terminal S is coupled in parallel circuit relationship with the common emitter circuits for the transistors 17 and 18 of each of the shifting elements of each shifting stage by means of a common bus, as shown. Normally the potential level provided by the shifting signal source 23 maintains the terminal S at a positive potential on the order of 2 volts. When a shifting signal is provided, this potential level is momentarily lowered to approximately —2 volts. Under normal conditions, then, with the terminal S having a potential value of +2 volts, the signal transmitting element of each shifting stage is under the control of its associated signal storage element and will assume a conductive condition to reflect the binary signal stored in the associated signal storage element. For example, if the transistor 10 of the signal storage element M1 is fully conductive or in saturated current condition, then the transistor 17 of the associated signal transmitting element will be placed in a nonconductive condition. The nonconductive condition of the trasistor 17 of this stage results through the coupling provided by the diode 25 coupled between the collector electrode of the conducting transistor 10 and the nonconducting transistor 17. At this same time, of course, the transistor 11 of the signal storage element M1 will be in a nonconductive condition while the transistor 18 of the associated transmitting element S1 will be in a conductive condition. The latter mentioned conductive condition of the transistor 18 results from the provision of the diode 24 connected to the collector for the transistor 11 and the base electrode for the transistor 18. Under steady state conditions the diode 27 is back biased and, therefore, a signal is not transferred from the transmitting element S1 to the signal storage element M2 of the second stage, et cetera.

Now assume that a signal is provided from the shifting signal source 23 to lower the potential on terminal S towards a —2 volts whereby as the terminal S passes through ground potential in going towards the negative potential the diodes 24 and 25 both become back biased and thereby render the first coupling element ineffective or decouple the associated elements of the shifting stage. At this interval, then, the transmitting elements of each of the shifting stages are not under the control of the associated signal storage elements. At this same time the diodes 26 and 27 comprising the second coupling means are in a condition whereby one of them will be forward biased for coupling the signals stored in the transmitting element to the succeeding signal storage element. The diode 26 or 27 of the second coupling means that is forward biased is dependent upon the conductive state of the associated transmitting element. For example, if the transistor 17 of signal storage element S1 is in a nonconductive condition, as described above, the companion transistor 18 is in a fully conducting condition to thereby force the transistor 11 of the signal storage element M2 to be nonconductive and the transistor 10 to be driven into saturation. In the same fashion, when the transistor 17 is conductive, the diode 27 forces the transistor 10 to a nonconductive state. It will then be seen that the information stored in the signal storage element M1 of the first shifting stage prior to the application of the shifting signal at terminal S will be stored in the signal storage element M2 of the second shifting stage. Of course, the conductive condition of transmitting element S2 will be represented as the signal stored in its signal storage element M3. In the same fashion, the signal stored in each of the other shifting stages will have been shifted.

Upon the termination of the shift pulse, the terminal S will once again assume its normal voltage level of +2 volts. With these conductive conditions prevailing, then, the first coupling means will once again become effective, that is, the diodes 24 and 25 will be effective for placing the associated signal transmitting elements of each of the shifting stages under the control of the associated signal storage elements whereby these signal transmitting elements will now assume a conductive condition corresponding to the binary characters that were just shifted into the associated signal storage elements. Of course, these signal storage elements will be decoupled from the succeeding signal storage elements due to the second coupling means being rendered ineffective.

Figure 2:
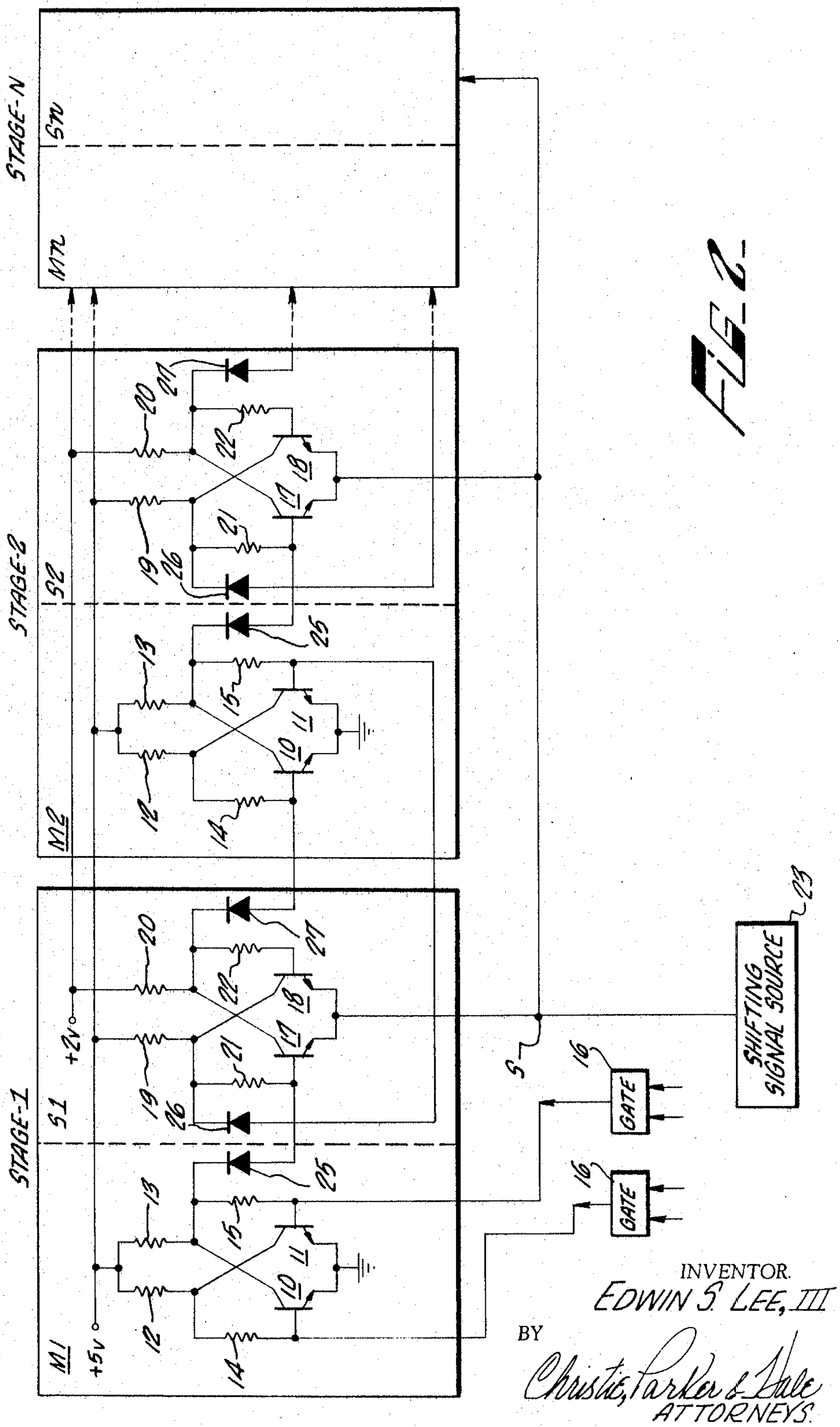
FIG. 2 is a schematic circuit diagram of a simplified version of the shift register of FIG. 1.

Now referring to FIG. 2, wherein is illustrated a shift register based on the structure of the shift register of FIG. 1 but in a simplified form. In this particular embodiment one diode in each first coupling means has been eliminated as a result of a change in the supply potentials utilized and thereby the conductive conditions of the circuit. To this end, the collector resistors 19 and 20 for the transistors 17 and 18 comprising the signal transmitting elements of each shifting stage have been modified whereby the resistors 20 in each stage are connected to a positive potential of +2 volts rather than +5 volts, as in the previous embodiment. The collector resistors 19 for the transistors 18 of each signal transmitting element of each shifting stage are maintained at the +5 volts potential as in the previous embodiment. Under these voltage conditions, then, it will be seen that the base and emitter potentials of the transistors 18 will be at the same potential and these transistors will be placed in a cut off or nonconductive condition.

The shifting action under these conductive conditions is the same as that described for the embodiment of FIG. 1. The alteration in the circuit operation of the embodiment of FIG. 2 resulting from the modification of the circuit is that with the transistors 18 of each signal transmitting element placed in a nonconductive condition, and then assuming that the transistor 10 of the associated signal storage element, for example M1, of stage 1 is in a saturated or fully conducting condition, the diode 25 connected to the collector electrode of the transistor 10 and the base electrode of the transistor 17 will be forward biased as a result of the conductive condition of the transistor 10 to thereby place the transistor 17 also in a nonconductive condition. If, however, the transistor 10 is in a nonconductive condition, then the diode 25 will be back biased and the transistor 17 in turn will be placed in a fully conducting condition because the transistor 18 is in a cut off condition. Accordingly, when the terminal S is driven from its normal voltage level of +2 volts towards a negative voltage level, the state of the signal transmitting element S1 will be determined by the state of the associated signal storage element as in the previous embodiment.

Assuming, then, that the terminal S passes through ground towards the negative potential level and that transistor 10 of M1 is in a nonconductive condition, then the transistor 18 will also be in a nonconductive condition while the transistor 17 will be fully conducting as previously mentioned. If the transistor 10, however, is in a saturated current condition at this interval, then the transistor 17 will be maintained in a cut off condition as the terminal S approaches the negative potential level and, at this time, then the transistor 18 will be forced into a saturated current condition in view of the change of the potential levels between the base and the emitter electrodes that rendered it normally nonconductive. The conduction of the transistor 18 will occur before the terminal S approaches ground level. After the terminal S has reached ground level and has gone through the ground potential towards the negative potential, the signal reflected by the conductive conditions of the transistors 17 in each signal storage element will be transferred to the signal storage element M2, M3, et cetera of the succeeding shifting stages, as described for the previous embodiments.

Figure 3:
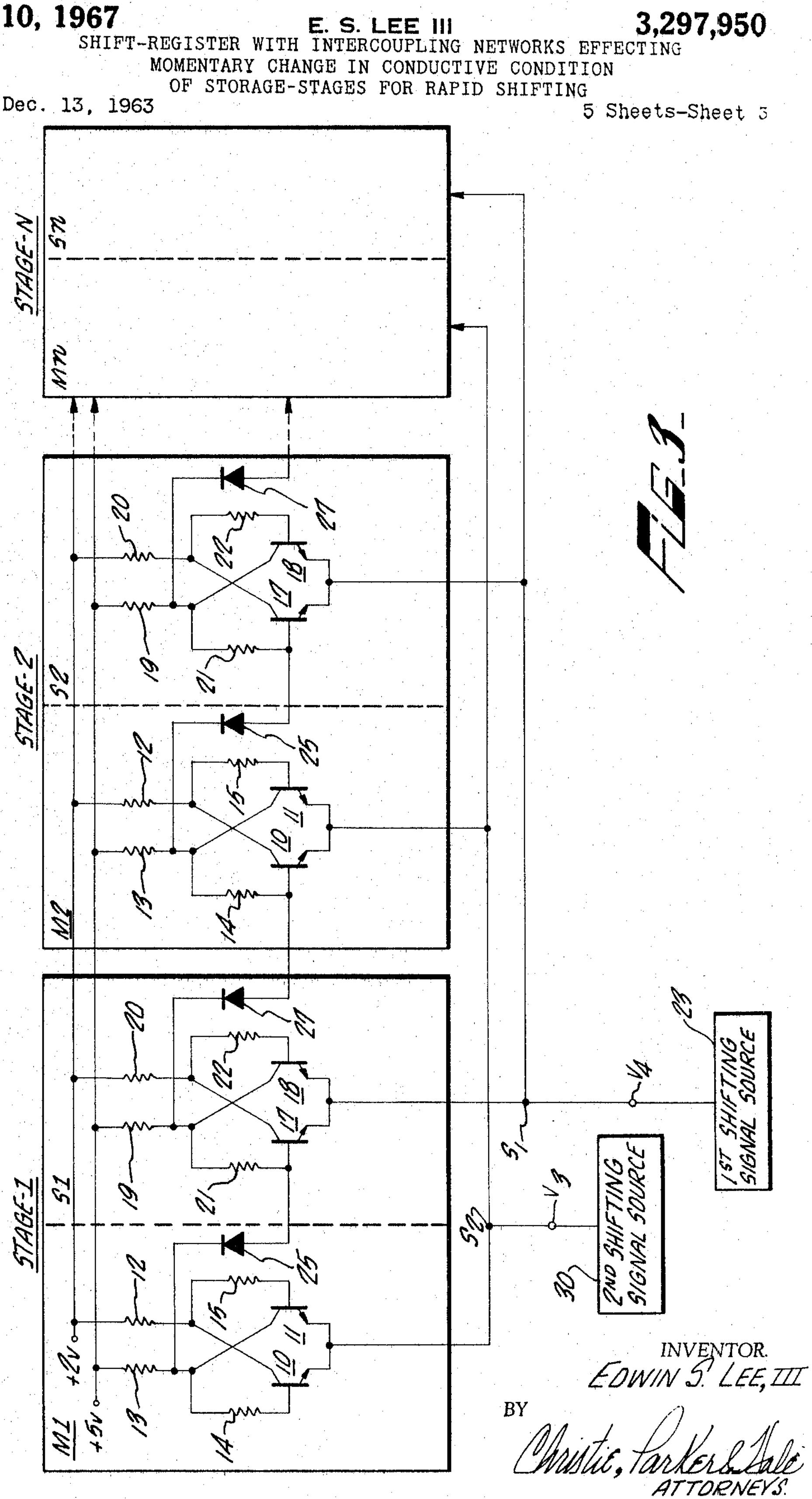
FIGS. 3 and 4 show a schematic circuit diagram of another embodiment of the shift register of the present invention utilizing two shifting pulses to effect the shifting operation.

Now referring to FIG. 3 wherein is illustrated another embodiment of the shift register shown in FIGS. 1 and 2. In this embodiment, the circuitry has been further simplified through the elimination of an additional coupling diode element. However, in this embodiment it is necessary to use two shifting signals in order to shift the information from stage to stage. In this particular embodiment the information is first shifted from the signal storage element M1 to the associated signal transmitting element S1 by the first shift pulse and then transmitting from the signal transmitting element S1 to the signal storage element M2 of the succeeding shifting stage as a result of the application of the second shifting signal.

The structure of the shifting register shown in FIG. 3 is based on that shown in FIG. 2. In this particular embodiment, however, the diodes 26 utilized in FIG. 2 for coupling the signal transmitting elements of each stage to the succeeding signal storage element have been eliminated. In addition, the resistive elements 12 connected to the collector electrodes of each of the transistors 10 for the signal storage elements of each stage have been connected to a positive potential of 2 volts rather than 5 volts, as in the previous embodiments. Accordingly, in this embodiment each of the resistive elements 13 and 19 for each shifting stage are connected to the +5 volt potential, while the resistive elements 12 and 20 of each stage are connected to a lower positive potential of +2 volts. A further modification of this shift register results from the application of the second shifting signal to a point S2 common to all the emitter electrodes for the transistors 10 and 11. The shifting terminal S2 is connected to a second shifting signal source 30. The conventional or first shifting signal source 23 is connected to the first shifting terminal S1 which couples all of the emitter electrodes for the signal transmitting transistors 17 and 18, as in the previous embodiment. The potential levels of the shifting terminals S1 and S2 are normally both at ground potential.

It should be noted that the logic of the shifting of the information in the shift register of this embodiment resides in raising the potential level at the shift terminal to which the information is to be transferred. Accordingly the shift terminal S1 first has its potential level raised to cause the information to be transferred from its associated signal storage element to the signal transmitting element. Once this transfer has been effected the shift terminal S2 has its potential level raised to cause information to be transferred from the signal transmitting elements to the signal storage elements of the succeeding shifting stage.

Assuming that the conductive condition in shifting stage 1 is such that the transistor 10 is fully conducting while the transistor 11 is in a cut off condition, then, when the terminal S1 is momentarily raised from ground potential, +2 volts, and back to ground potential, the transistor 18 will have been rendered nonconductive. As a result of the coupling action of the diode 25 and the conductive condition of the transistor 10, the associated transistor 17 is also rendered nonconductive during this interval. When the potential of the shift terminal S1 decreases from the positive voltage towards ground, this voltage level effectively dominates the conductive condition of the signal transmitting element and leaves this element with the transistor 17 in a nonconductive condition. Accordingly, the transistor 18 is in a conductive condition and, therefore, upon the termination of the shifting signal applied at the terminal S1, the conductive condition of the transistor 10 is reflected in the signal transmitting element S1 by the conductive condition of the transistor 18.

Following the termination of the shifting signal at the terminal S1, the potential level of the terminal S2 is raised from ground level towards the +2 volt level and then back to ground. As a result of the conductive conditions resulting from this change in voltage level, the signals stored in the signal transmitting elements are transferred to the signal storage elements of the succeeding stages, that is, the conductive condition of the transistor 18 of S1 of the first stage is represented by the corresponding conductive condition of the transistor 10 of the signal storage element M2 of stage 2. It will be recalled that this corresponds to the conductive condition of transistor 10 of the signal storage element M1 of stage 1 prior to the application of the shifting pulse S1.

In the same fashion it can be shown that when the transistor 10 of the signal storage element is in a nonconductive condition and upon the application of the shifting signal at terminal S1, the resulting conductive conditions of transistors 17 and 18 is such that upon the termination of this shifting signal the transistor 17 is rendered conductive while the transistor 18 is rendered nonconductive. Under these conditions, as in the operation described immediately hereinabove, the application of the second shifting signal at terminal S2 will result in the transistor 10 of the succeeding stage being rendered nonconductive upon the termination of the shifting pulse at terminal S2 and therey also correspond to the conductive condition of the signal storage element of the previous stage.

Now referring to FIG. 4, a further embodiment of the shifting register of the invention will be described. In this circuit configuration the signal transmitting element associated with each signal storage element is embodied by a resistance capacitive, RC, coupling network. It should be noted that although the circuit configuration of the embodiment of FIG. 4 has been simplified that the shifting rates possible with this embodiment are much slower than those previously described, the shifting rates being less than one megacycle.

The signal storage element in this embodiment comprises the transistor circuit having essentially the same circuit configuration as described for the embodiment of FIG. 3. It will be noted that the collector resistors 12 and 13 are connected to positive potentials of 2 and 5 volts, respectively, as in the previous embodiment, and that a single shifting signal source 30 is only necessary and that the shifting signal is applied from the source 30 to the common connection between the emitter electrodes of the transistors 10 and 11 for the signal storage elements of the shifting stages.

The signal transmitting elements are arranged whereby a resistor 32 is coupled with one end connected in common with the common junction of the voltage dividing resistors 13 and 14 and with its opposite end connected in series circuit relationship with a coupling diode 33. The diode 33 is arranged with its cathode electrode connected to the remaining terminal of the resistor 32 and its anode electrode connected directly to the base electrode for the transistor 10 of the succeeding shifting stage. A capacitor 34 is coupled to a common junction $e_1$ of the resistor 32 and the diode 33 and ground potential as illustrated.

Figure 4:
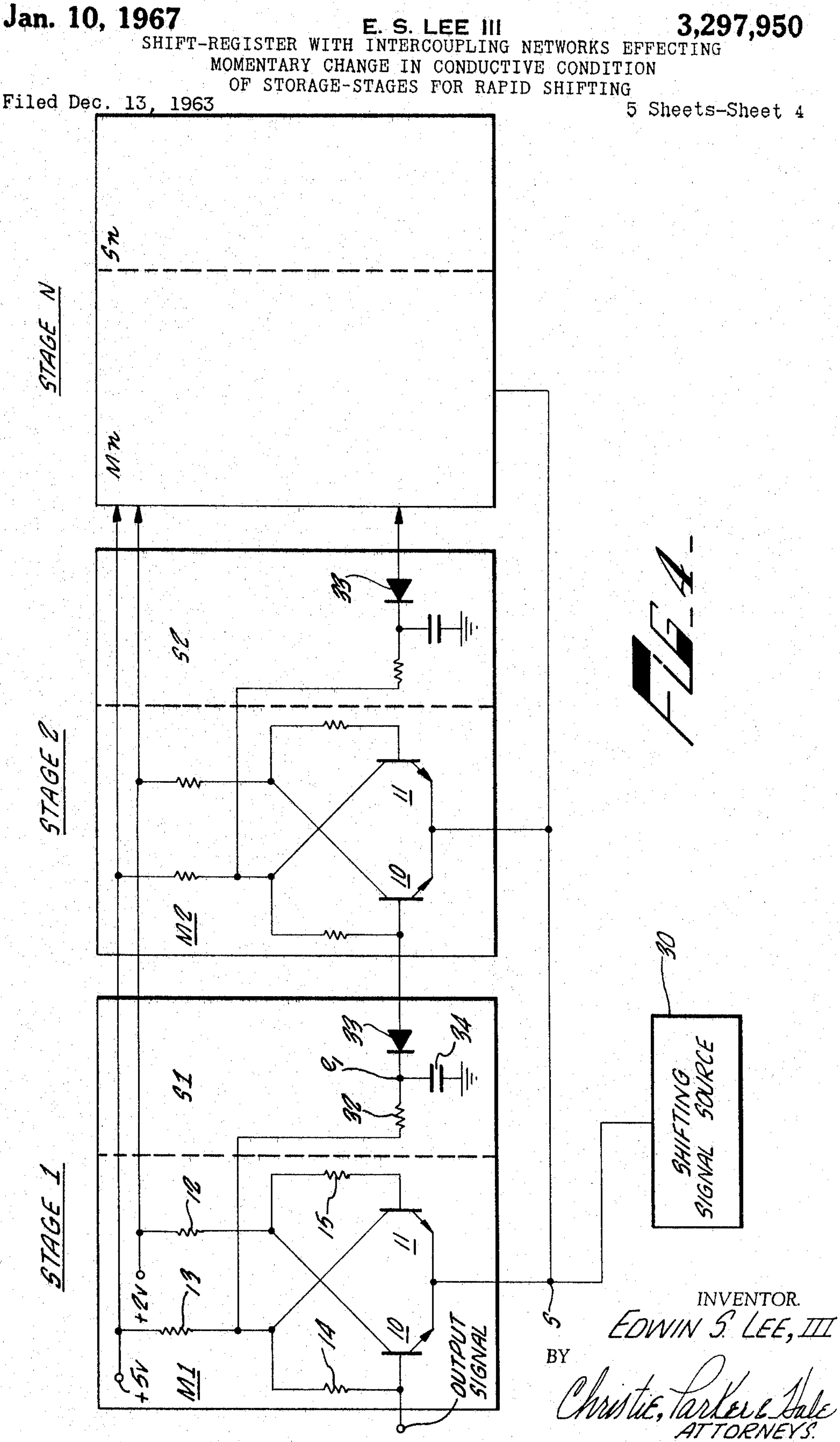

The logic of the shifting register illustrated in FIG. 4 is such that the shifting signal applied to the signal storage elements of each shifting stage tends to cause the signal storage elements to store a zero. If the preceding shifting stage stored a binary one, then this signal will be transmitted by the signal transmitting element as a result of the conduction of the diodes 33 to the signal storage element of the next stage and override the effect of the shifting signal and thereby cause the succeeding stage to assume a conductive condition representative of the binary one. Of course, if the previous stage had not stored a binary one, no signal will be transmitted from one stage to the next due to the diode 33 being back biased and the corresponding signal storage element will assume a conductive condition representative of the binary zero and thereby also correspond to the storage condition of the previous signal storage element.

Examining the circuit operation of the shift register under consideration, it will be noted that when the signal storage element assumes a storage condition representative of a binary one that the transistor 10 will be in a nonconductive condition while the transistor 11 will be in a conductive condition. Under these conductive conditions the common junction $e_1$ between the resistor 32, diode 33, and capacitor 34 will assume a potential of approximately ground level. It should be noted that the diode 33 will conduct only if the potential of the point $e_1$ is at ground level immediately prior to the application of the shifting signal from the source 30 to the shifting terminal S. Accordingly, under the assumed conductive conditions, the changes in potential at the shifting terminal S will be effective to cause the unblocking of the diode 33 and thereby a signal to be transmitted to the base electrode of the transistor 10 of the succeeding shifting stage. This signal will override the effect of the rise in potential level at the emitter electrodes of the transistors 10 and 11 due to this same shifting signal and place the transistor 10 in a nonconductive condition and the transistor 11 in a conductive condition to store the binary one previously stored in the preceding stage.

Now assuming that the signal storage element M1 of the first stage stores a binary zero, it will be noted that the transistor 10 will be fully conducting and its corresponding transistor 11 will be in a nonconductive condition. As a result of these conductive conditions, the voltage level at the point $e_1$ will be approximately +4 volts, the point $e_1$ assuming the potential level of the capacitor 34 after a predetermined time depending on the RC time constant of the circuit. As a result, the diode 33 is once again back biased and, upon the application of the shifting signal from the source 30, the diode 33 will not be rendered conductive and, accordingly, no signal is transmitted from stage to stage and the shifting signal will be effective at each signal storage element of each shifting stage following a shifting stage that had previously stored a binary zero to place these stages in a binary zero conductive condition. Specifically, the transistors 10 will be fully conducting while the transistors 11 will be correspondingly nonconductive. It should be noted that the time interval at which the shifting terminal S is positive is very small compared to the time constant of the resistors 32 and 34 whereby the potential level $e_1$ is not affected as a result of the terminal S being momentarily at a positive level during the shifting interval and, therefore, the voltage level at the point $e_1$ cannot significantly change due to the presence of the capacitors 34 and thereby cannot render the diode 33 conductive during the time intervals that the associated signal storage elements are in a binary zero condition.

Figure 5:
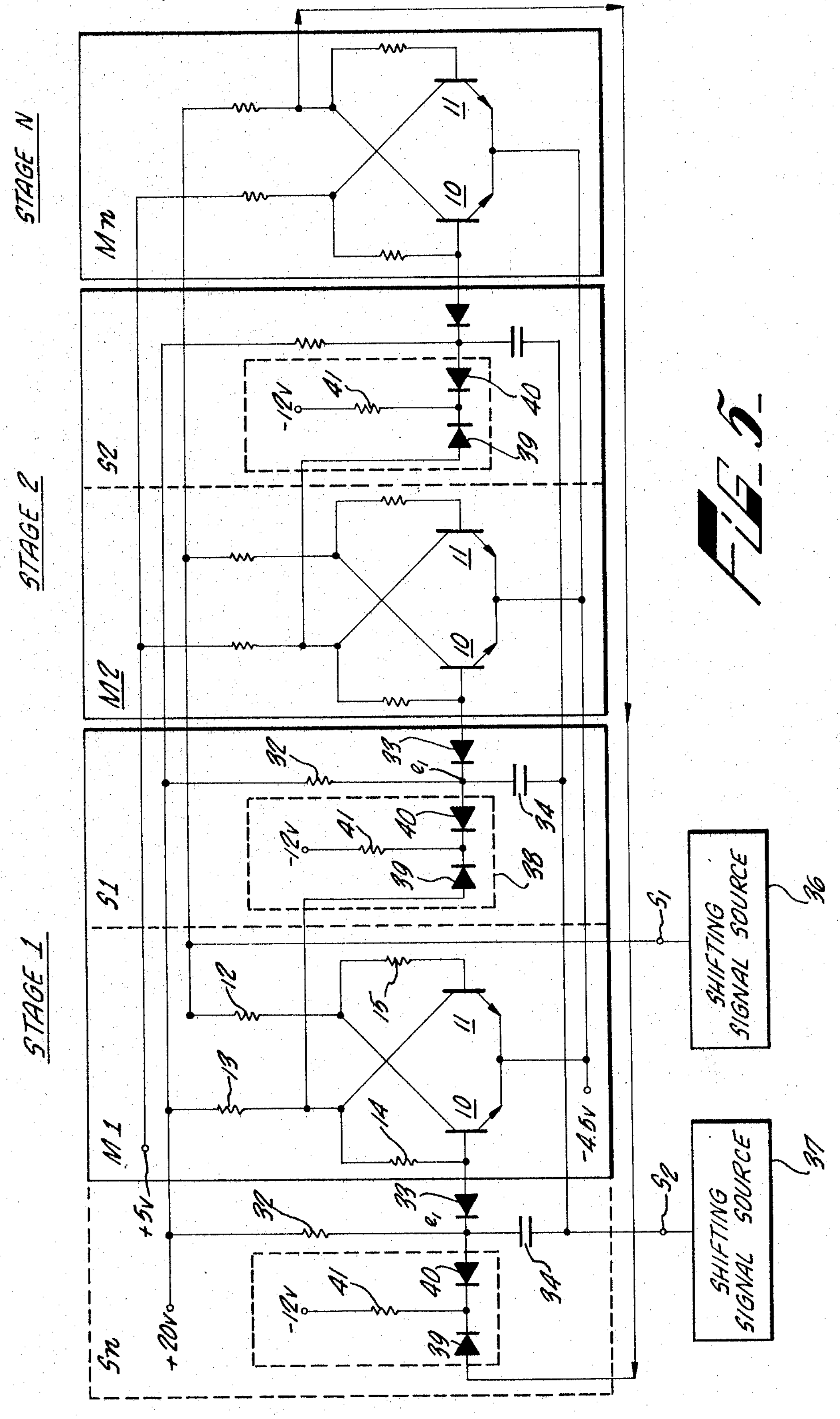
FIG. 5 is a schematic circuit diagram of another embodiment of the shift register of the present invention.

Now referring to FIG. 5 another embodiment of the shift register will be described. The shift register shown in FIG. 5 is of the same general type as that discussed hereinabove in conjunction with FIG. 4. In this embodiment, however, the resistance-capacitance coupling loop has been modified by the addition of a pair of coupling diodes and a resistor to allow higher operating speeds and which speeds are comparable to the high speed shift registers previously described hereinabove. Furthermore, this allows more flexibility on the input gating arrangement. As in the embodiment of FIG. 4, the information shifted in this arrangement is determined by the voltage level of the point $e_1$ immediately prior to the application of the shifting signals thereto. In this embodiment, however, two separate shifting pulses are required rather than a single one as in the embodiment of FIG. 4.

The basic construction of the signal storage element of each shifting stage is the same as the embodiment previously described, namely, the transistor storage elements. In this instance, however, the resistive elements 12 are connected to the shifting terminal S1 and, in turn, to the shifting signal source 36. The potential level normally maintained at the terminal S1 is on the order of +5 volts, the shifting signal source 36 being effective to drop this voltage level to a negative level of approximately 4.5 volts. In addition, it should be noted that the common emitter points of the transistors 10 and 11 are connected to a negative voltage bus of −4.5 volts and these emitters are maintained at this voltage level at all times. The signal storage element further includes the input network of the resistor 32 having one end connected in common with the capacitor 34 and the input diode 33 at the junction $e_1$. In this instance the opposite end of the resistor 32 is connected to a positive potential source of approximately 20 volts. In the same fashion the opposite end of the capacitor 34 is connected to the shifting terminal S2 which, in turn, is connected to a shifting signal source 37. The terminal S2 is normally maintained at ground potential and is momentarily dropped to a negative potential level of −3 volts upon receipt of a signal from the shifting signal source 37. Also controlling the transfer of the signals from shifting stage to shifting stage is a network defined as a gating circuit 38. The gating circuit comprises a diode 39 coupled with its anode electrode to the common junction of the resistors 13 and 14 of the signal storage element of the associated signal storage element and with its cathode connected in common with the cathode electrode of another diode which has its anode in turn connected to the point $e_1$ of the RC coupling network for the succeeding stage. It should be noted that the anode electrode of the diode 40 is then connected in series circuit relationship with the cathode electrode of the diode 33. Connected in common with the cathode electrodes of the diodes 39 and 40 is one end of the gating resistor 41. The resistor 41 has its opposite terminal connected to a negative potential source of −12 volts.

It should be noted that the diode 40 is always forward biased as the current flowing through the resistor 41 to the −12 volt supply is always greater than the current flowing from the +20 volt supply through the resistor 32. A true signal appears at the anode of the diode 39 only when the transistor 11 is fully conducting. A true signal appearing at the anode electrode of the diode 39 will have a voltage level of approximately −4.5 volts. When a false signal is present at this point the transistor 11 is in a nonconducting condition and the voltage level at the anode of the diode 39 is above ground.

With the above structure in mind, the operation of the shifting register of FIG. 5 will be more closely examined. Although both shifting terminals S1 and S2 may be pulsed at the same time for effecting the transfer of information from stage to stage, the operation is best described by examining the circuit conditions as the signals are applied sequentially. Assuming then that the terminal S1 is first pulsed to cause the terminal to momentarily drop from its positive voltage level of 5 volts to a negative level of −4.5 volts, this action then forces the transistor 11 to a nonconductive condition and sets the signal storage element to a state corresponding to the binary zero at the termination of the first shifting pulse applied to the terminal S1. After the terminal S1 has returned to its positive potential level, the terminal S2 has been experiencing a change from its ground level to a negative level of 3 volts. If the potential level at the point $e_1$ was at −4.5 volts prior to the terminal S2 going negative, then when this terminal assumed a negative level the diode 33 would be forward biased and the transistor 10 would accordingly be cut off. Since the terminal S2 remains at a negative voltage level for a longer period than the terminal S1, then the transistor 10 would be in a nonconductive state after the terminal S2 returned to its normal ground level potential. This results in setting the signal storage element to a conductive state corresponding to the binary one. If however, the potential level at the point $e_1$ were more positive than ground prior to the occurrence of the negative swing of the terminal S2, then the diode 33 would never be back biased and the voltage level at the terminal S1 would be effective to set the signal storage element in a conductive state corresponding to the binary zero. A finite time is generally required between the shifting signal at terminals S1 and S2 to allow the capacitor 33 to recharge to a new level determined by the potential at the anode of diode 39.

An important aspect of the circuit configuration of FIG. 5 is the control of the information shifted into the shifting stages by means of the gating circuit 38. It will be recognized that additional AND gating circuits can be coupled in parallel with the circuits 38 to control the state of the succeeding shifting stage. Also, additional diodes connected to the input circuits of the signal storage elements in the fashion of the diodes 33 to form an OR gate may be provided. With this circuit arrangement, when any one of the diodes provides a true signal, the coupled signal storage element will store a binary one and when all are false a binary zero will be stored after the shift pulses are applied. Other gating arrangements will occur to those skilled in the art.

What is claimed is:

1. An electronic shift register comprising a plurality of shifting stages adapted to assume alternate conductive conditions for storing binary characters and normally connected in a decoupled cascade relationship to allow a binary character to be stored in each stage and shifted from stage to stage, and means coupled to each shifting stage for momentarily altering the normal conductive condition of each shifting stage for controlling the coupling between stages to cause each stage to substantially simultaneously assume the conductive condition of the adjacent stage upon the restoration of the normal conductive conditions of the shifting stages and thereby cause the binary characters to be sequentially shifted from stage to stage solely in response to the momentary change in conductive conditions of the shifting stages.

2. An electronic shift register as defined in claim 1 wherein each shifting stage comprises a signal storage element and a signal transmitting element arranged in a cascade circuit relationship and normally arranged in a coupled relationship whereby the signal transmitting element reflects the binary character stored in the associated storage element.

3. An electronic shift register as defined in claim 2 wherein the signal storage element comprises a bistable storage element and the signal transmitting element comprises an RC network.

4. An electronic shift register comprising a plurality of signal shifting stages, each stage comprising a signal storage cell and a signal transmitting cell arranged in a cascade fashion, means for coupling and decoupling the signal storage cell and the associated transmitting cell and the succeeding signal storage cell in a circuit relationship to cause the transmitting cell to store the same binary character as the associated storage cell when the pair are coupled and the succeeding signal storage cell to store the signal of the transmitting cell when coupled thereto, means for momentarily altering the conductive condition of the signal transmitting cell to cause the cell to be momentarily decoupled from its storage cell and coupled to the storage cell of the succeeding shifting stage to cause said later storage cell to store the binary character received from the coupled signal transmitting cell.

5. An electronic shift register comprising a plurality of shifting stages for shifting an electrical signal from one stage to another stage, each stage comprising a signal storage element and a combination signal storing and transmitting element, and means for momentarily altering the conductive condition of at least one of the elements of each stage for controlling the coupling between said elements of each stage to shift a signal from one storage element dynamically through said storing and transmitting elements, to the storage element of the succeeding stage.

6. An electronic shift register comprising a plurality of shifting stages for shifting an electrical signal from one stage to another stage, each stage comprising a signal storage cell and a signal transmitting cell, first coupling means connected between each associated signal storage and transmitting cells to cause the transmitting cell to store the same binary character as the associated signal storage cell when coupled together and normally arranged in a coupled relationship, second coupling means connected between each signal transmitting cell of one stage and the signal storage cell of the succeeding stage to cause the storage cell to store the binary character of the coupled transmitting cell when coupled together and normally arranged in a decoupled relationship, and means for momentarily altering the conductive conditions of each of the signal transmitting cells to cause the first coupling means to become decoupled and the second coupling means to couple the respective signal storage and transmitting cells to thereby effect the shifting of the stored signals from stage to stage.

7. An electronic shift register including a first shifting stage comprising a bistable storage element capable of assuming alternate conductive conditions for storing binary characters, a signal transmitting network coupled to the output of the storage element to reflect the storage condition of the element, a second shifting stage defined in the same fashion as the first shifting stage and having its bistable storage element connected to the signal transmitting network of the first shifting stage in a decoupled relationship, and means for momentarily and periodically altering the conductive condition of the signal transmitting networks for controlling the coupling between stages to cause a stored signal to be transferred therethrough to the succeeding shifting stage.

8. An electronic shift register as defined in claim 7 wherein the signal transmitting networks comprise a resistance-capacitance circuit.

9. An electronic shift register as defined in claim 8 including means for momentarily and periodically altering the conductive conditions of the bistable storage elements for shifting binary characters therein.

10. An electronic shift register as defined in claim 8 wherein the signal transmitting networks include a gating circuit coupled between the bistable storage element and the resistance-capacitance circuit.

References Cited by the Examiner

UNITED STATES PATENTS

| | | | |
|---|---|---|---|
| 2.785,304 | 4/1957 | Bruce et al. | 328—37 |
| 2,907,898 | 10/1959 | Clark | 307—88.5 |
| 3,121,176 | 2/1964 | Burns et al. | 307—88.5 |
| 3,185,864 | 5/1965 | Amodei et al. | 307—88.5 |

References Cited by the Applicant

Poppelbaum, "Flow Gating," published on pages 138 through 141 in the Western Joint Computer Conference in April 1958.

ARTHUR GAUSS, *Primary Examiner.*

J. HEYMAN, *Assistant Examiner.*